United States Patent
Yasuoka et al.

(10) Patent No.: US 8,172,680 B2
(45) Date of Patent: May 8, 2012

(54) INFORMATION PROCESSING SYSTEM FOR CAPTURING OPERATIONS, TRANSFERRING DATA AND PERFORMING REMOTE OPERATIONS

(75) Inventors: Tomohiro Yasuoka, Tokyo (JP); Tetsujiro Kondo, Tokyo (JP); Ryuhei Sakanoue, Tokyo (JP)

(73) Assignee: Sony Corporation, Tokyo (JP)

( * ) Notice: Subject to any disclaimer, the term of this patent is extended or adjusted under 35 U.S.C. 154(b) by 395 days.

(21) Appl. No.: 12/536,170

(22) Filed: Aug. 5, 2009

(65) Prior Publication Data

US 2010/0032904 A1 Feb. 11, 2010

(30) Foreign Application Priority Data

Aug. 11, 2008 (JP) ................. 2008-206779

(51) Int. Cl.
*A63F 13/00* (2006.01)
(52) U.S. Cl. .......... 463/36; 473/152; 473/198; 473/199; 273/317.1; 273/317.2; 273/317.9; 434/252
(58) Field of Classification Search .............. 463/36; 273/317.1, 317.2, 317.9; 434/252; 473/140, 473/152, 198, 199
See application file for complete search history.

(56) References Cited

U.S. PATENT DOCUMENTS

| | | | | |
|---|---|---|---|---|
| 5,423,554 A | * | 6/1995 | Davis ........................ | 463/4 |
| 5,846,139 A | * | 12/1998 | Bair et al. ................. | 473/156 |
| 5,906,547 A | * | 5/1999 | Tynan ....................... | 473/199 |
| 6,273,819 B1 | * | 8/2001 | Strauss et al. ............ | 463/36 |
| 6,620,043 B1 | * | 9/2003 | Haseltine et al. ......... | 463/7 |

FOREIGN PATENT DOCUMENTS

| | | |
|---|---|---|
| JP | 62-11472 | 1/1987 |
| JP | 6-46479 | 2/1994 |
| JP | 8-503390 | 4/1996 |
| JP | 8-509643 | 10/1996 |
| JP | 2002-58771 | 2/2002 |
| JP | 3329443 | 7/2002 |
| JP | 2002-239052 | 8/2002 |
| JP | 2002-304246 | 10/2002 |
| JP | 2003-265665 | 9/2003 |
| JP | 2005-261956 | 9/2005 |
| JP | 2008-55544 | 3/2008 |
| WO | WO 94/11069 | 5/1994 |
| WO | WO 94/25129 | 11/1994 |
| WO | WO 95/30964 | 11/1995 |

OTHER PUBLICATIONS

Phantom Desktop Haptic Device, (http://www.sensable.com/haptic-phantom-desktop.htm).

* cited by examiner

*Primary Examiner* — Dmitry Suhol
*Assistant Examiner* — David Duffy
(74) *Attorney, Agent, or Firm* — Oblon, Spivak, McClelland, Maier & Neustadt, L.L.P.

(57) ABSTRACT

An information processing system includes an input section that inputs movement information of an object on which a user performed an operation in an operation environment, and an output section that holds another object in a remote site remote from the operation environment and reproduces a movement of the object on which the user performed the operation on the basis of the movement information received from the input section.

12 Claims, 14 Drawing Sheets

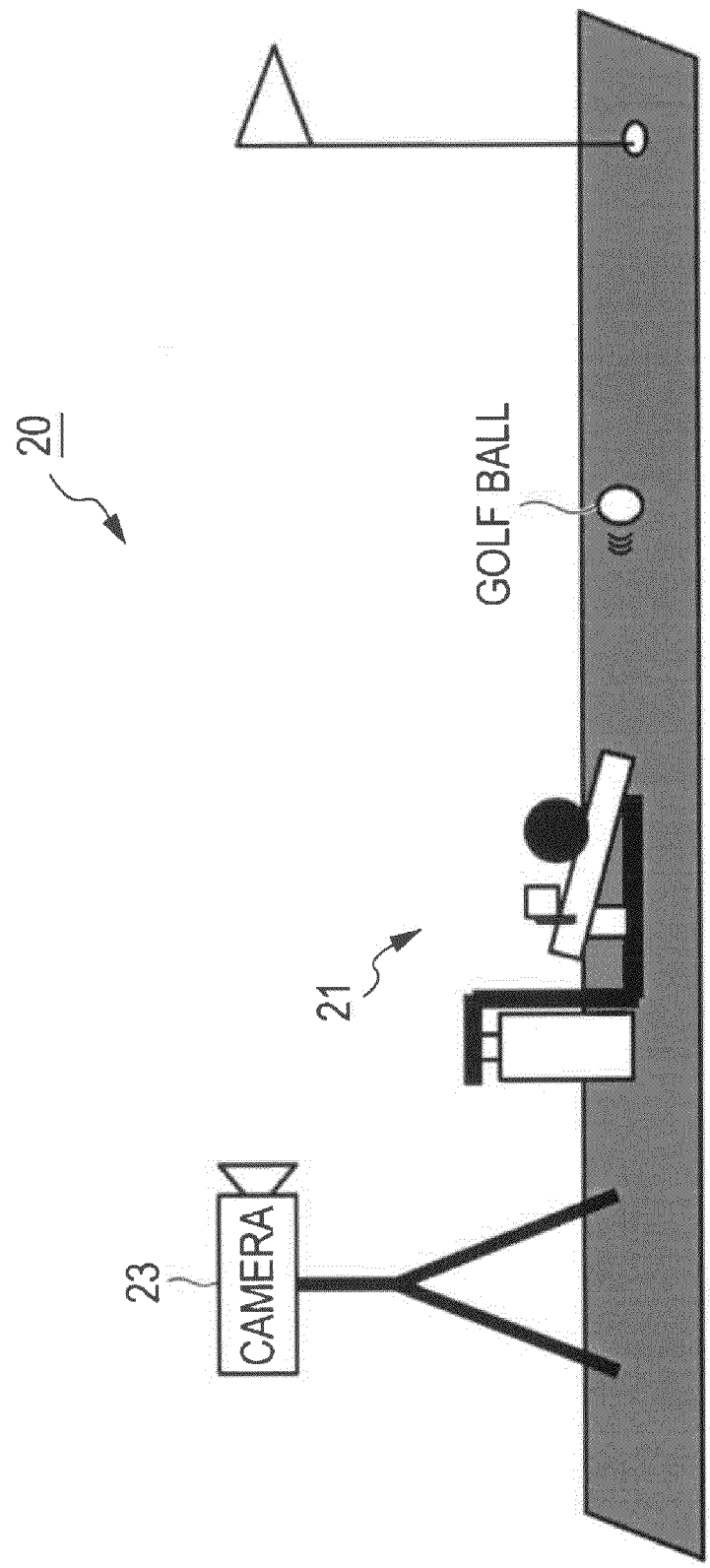

INFORMATION PROCESSING SYSTEM FOR CAPTURING OPERATIONS, TRANSFERRING DATA AND PERFORMING REMOTE OPERATIONS

BACKGROUND OF THE INVENTION

1. Field of the Invention

The present invention relates to an information processing system that performs information processing in accordance with input operations by a user. In particular, the present invention relates to an information processing system that captures user operations, transfers data, and performs remote operations in a remote site in accordance with the user operations.

In detail, the present invention relates to an information processing system that reproduces, in a remote site, an operation in which a user applied an external force to an object with a tool. In particular, the present invention relates to an information processing system that reproduces, in a remote site, a movement of an object caused by an external force that a user applied to an object with a tool.

2. Description of the Related Art

Virtual technology and remote technology are applied to learning of special skills such as medical skills and to operations in special or dangerous environments such as microcosms, oceans, and nuclear reactors.

In virtual technology, a method of providing three-dimensional kinesthetic and tactile sensation for an object, by using a haptic device in an environment that does not allow direct touching to the object, is used. For example, kinesthetic and tactile sensation is generally provided by using a pen-shaped haptic device having a serial link. A user holds an end portion of the pen-shaped device so as to provide a moment of force with three to six axes (see, for example, http://www.sensable-.com/haptic-phantom-desktop.htm (as of Aug. 4, 2008)). In order to overcome the insufficient rigidity of a serial link, a haptic device that uses a parallel link so as to provide a moment of force with three to six axes has been proposed (see, for example, Japanese Patent No. 3329443). Moreover, a virtual environment system that uses a lightweight and wearable device worn on a wrist of an operator so as to provide kinesthetic sensation to the operator in a virtual environment has been proposed (see, for example, Japanese Unexamined Patent Application Publication No. 2002-304246).

In remote technology, master/slave-type manipulators, which allow a user to operate a humanoid robot in a remote site as if he/she were on the site, are generally used. Such manipulators are used in remote medical or remote-control heavy equipment.

For example, a surgical robot system, which includes a master controller having a manual input device that is movable in an operation space of an operator/controller; a manipulator including a slave arm having a surgical end effecter; at least one drive servo being operatively connected to the end effecter, the at least one drive servo moving the end effecter in a surgical operation space in accordance with a slave control signal; an imaging system including an image capture device having a movable field of view of the surgical operation space, the imaging system generating a position signal representing the field of view; and a processor that connects the master controller to the slave arm, the processor generating the slave control signal by mapping an input device in the operation space to the end effecter in the surgical operation space by using conversion that is derived from the position signal from the imaging system, has been proposed (see, for example, Japanese Unexamined Patent Application Publication No. 2005-261956).

In the remote technology using a master/slave manipulator with which a user or an operator performs a remote operation of a robot, when the user performs an operation so as to apply an external force to an object with a tool, an end effecter on an arm of the robot holds a similar tool so as to follow the movement of an arm of the user. However, reproduction of the movement is very difficult, because it is necessary to reproduce not only the operation by the user on the tool but also the movement of the object.

For example, a system, in which a multijoint structure is attached to a human body so as to obtain a positional relationship with respect to a reference point and shapes of the head, hands, feet, arms, and legs in real-time when he/she performs a golf swing or the like, transmits the data to the outside, such as a remote site, by using wired or wireless communication, so that a robot or a machinery in the outside is controlled, has been proposed (see, for example, Japanese Unexamined Patent Application Publication No. 2008-55544). Although the system is capable of reproducing a movement, such as a golf swing, of a human in a remote site by using an outside robot, what kind of movement of the ball can be made by the golf swing is not described in the document.

A golf simulation game, in which a remote controlled golfer plays a golf on a small golf course, has been proposed (see, for example, Japanese Unexamined Patent Application Publication (Translation of PCT Application) No. 08-509643). However, although the game reproduces a movement of a golfer in a virtual environment such as a small golf course, the game does not reproduce the movement of a golf ball on the remote golf course.

SUMMARY OF THE INVENTION

It is desirable to provide an excellent information processing system that captures user operations and transfers the data so as to excellently perform remote operations corresponding to the user operations in a remote site.

It is desirable to provide an excellent information processing system that excellently reproduces, in a remote site, an action with which a user applied an external force to an object with a tool.

It is desirable to provide an excellent information processing system that excellently reproduces, in a remote site, a movement of an object to which a user applied an external force with a tool.

It is desirable to provide an excellent information processing system that excellently reproduces, in a remote site such as a real golf course, a movement of a ball when a user performed a golf swing.

According to an embodiment of the present invention, there is provided an information processing system including an input section that inputs movement information of an object on which a user performed an operation in an operation environment, and an output section that holds another object in a remote site remote from the operation environment and reproduces a movement of the object on which the user performed the operation on the basis of the movement information received from the input section.

The term "system" refers to logical assembly of a plurality of devices (or functional modules capable of performing specific functions) irrespective of whether the devices or the functional modules are disposed in a single housing.

In the information processing system, the input section may include a camera that takes images of the movement of the object on which the user performed the operation, and a detector that generates the movement information of the object including speed and direction thereof by detecting the movement of the object by processing signals of the images taken by the camera; and the output section may include a movement-to-control-value converter that converts the movement information received from the input section to a control value including the speed and direction, and an ejector that ejects the another object in accordance with the control value.

In the information processing system, the output section may include a projection camera that takes images of a landscape of the remote site; and the input section may include a projection screen that shows a projected image to the user, and a projector that projects the images taken by the projection camera onto the projection screen.

In the information processing system, the ejector may include a launcher that ejects the another object at a desired speed, and a pan head that rotatably supports the launcher. The launcher ejects the another object in accordance with a speed control value that is output from the movement-to-control-value converter. The pan head rotates an ejection direction of the launcher by using a direction control value that is output from the movement-to-control-value converter.

In the information processing system, the launcher may include a guide that guides the another object, a stopper that stops the another object on the guide, and a rubber tire that provides a circumferential speed to an outer periphery of the another object that is input when the stopper is removed, the rubber tire being rotated by a motor.

In the information processing system, when a speed specified by the movement information received is equal to or less than a circumferential speed that the rubber tire provides to the another object at a lower limit of a rotation speed of the motor, the rubber tire may provide the another object with the specified speed by utilizing residual rotation of the motor that is dependent on a time elapsed after power supply to the motor is stopped.

According to an embodiment of the present invention, there is provided an information processing system including a first input section that inputs movement information of an object on which a user performed an operation on a user's side of a game played against an opponent; an object retrieving unit that retrieves the object on which the user performed the operation on the user's side; a first output section that reproduces, on an opponent's side of the game, a movement of the object on which the user performed the operation on the basis of the movement information received from the first input section; a second input section that inputs movement information of another object on which the opponent performed an operation on the opponent's side of the game; and a second output section that reproduces, on the user's side of the game and by using the object retrieved by the object retrieving unit, a movement of the another object on which the opponent performed the operation on the basis of the movement information received from the second input section.

In the information processing system, the first input section may include a first camera that takes images of the movement of the object on which the user performed the operation, and a first detector that generates the movement information of the object including speed and direction thereof by detecting the movement of the object by processing signals of the images taken by the first camera; the first output section may include a first movement-to-control-value converter that converts the movement information received from the first input section to a control value including the speed and direction, and a first ejector that ejects the another object in accordance with the control value; the second input section may include a second camera that takes images of the movement of the another object on which the opponent performed the operation, and a second detector that generates the movement information of the another object including speed and direction thereof by detecting the movement of the another object by processing signals of the images taken by the second camera; and wherein the second output section may include a second movement-to-control-value converter that converts the movement information received from the second input section to a control value including the speed and direction, and a second ejector that ejects the object in accordance with the control value.

In the information processing system, the second input section may further include a projection camera that takes images of the opponent's side; and the second output section may further include a projection screen that shows a projected image to the user, and a projector that projects the images of the opponent's side taken by the projection camera onto the projection screen.

In the information processing system, each of the first ejector and the second ejector may include a launcher that ejects the corresponding object at a desired speed, and a pan head that rotatably supports the launcher. The launcher ejects the corresponding object in accordance with a speed control value output from the corresponding movement-to-control-value converter. The pan head rotates an ejection direction of the launcher by using a direction control value that is output from the corresponding movement-to-control-value converter.

In the information processing system, the launcher may include a guide that guides the object, a stopper that stops the object on the guide, and a rubber tire that provides a circumferential speed to an outer periphery of the object that is input when the stopper is removed, the rubber tire being rotated by a motor.

In the information processing system, when a speed specified by the movement information received is equal to or less than a circumferential speed that the rubber tire provides to the object at a lower limit of a rotation speed of the motor, the rubber tire may provide the object with the specified speed by utilizing residual rotation of the motor that is dependent on a time elapsed after power supply to the motor is stopped.

According to an embodiment of the present invention, there is provided an excellent information processing system that excellently reproduces, in a remote site, an action with which a user applied an external force to an object with a tool.

According to an embodiment of the present invention, there is provided an excellent information processing system that excellently reproduces, in a remote site, the movement of an object to which a user applied an external force with a tool.

According to an embodiment of the present invention, there is provided an excellent information processing system that excellently reproduces, in a remote site such as a real golf course, the movement of a ball when a user performed a golf swing.

According to an embodiment of the present invention, the movement of an object such as a golf ball, on which a user performed an operation in an operation environment such as in a room, when a user performed a golf swing, can be precisely reproduced in a remote site, such as a real golf course, that is remote from the operation environment.

According to an embodiment of the present invention, movement information of an object including the speed and direction that are obtained by processing image signals is generated in the input section. In the output section, an object is ejected in accordance with the speed and direction converted from the movement information received. Thus, the movement of the object on which a user performed an operation can be precisely reproduced in a remote site.

According to an embodiment of the invention, a user in an operation environment performs an operation on an object while watching images of a remote site displayed on a projection screen and imagining as if he/she were on the remote site.

According to an embodiment of the invention, the ejector disposed in a remote site includes a pan head and a launcher capable of ejecting an object at a desired speed. By moving the pan head and the launcher in accordance with the speed and direction command values obtained from the movement information, the movement of the object on which a user performed an operation in an operation environment can be precisely reproduced in a remote site.

According to an embodiment of the invention, circumferential speed of a rubber tire rotated by a motor is provided to an outer periphery of an object that is input, whereby a speed specified by the movement information can be provided to the object.

According to an embodiment of the invention, even when the speed specified by the received movement information is equal to or less than the circumferential speed that the rubber tire provides at a lower limit of a rotation speed of the motor, the rubber tire provides the object with the speed specified by the received movement information by utilizing residual rotation of the motor that is dependent on a time elapsed after supply of driving power to the motor is stopped.

According to an embodiment of the invention, a game in which a player competes against an opponent, such as air hockey, can be played with an opponent on an opponent's side in a remote site.

Further characteristics and merits of the embodiments of the present invention are described in detail below with reference to the attached drawings.

BRIEF DESCRIPTION OF THE DRAWINGS

FIG. 3 shows an example of a remote site, such as a real golf course;

DESCRIPTION OF THE PREFERRED EMBODIMENTS

Hereinafter, embodiments of the present invention are described in detail with reference to the drawings.

Figure 1:
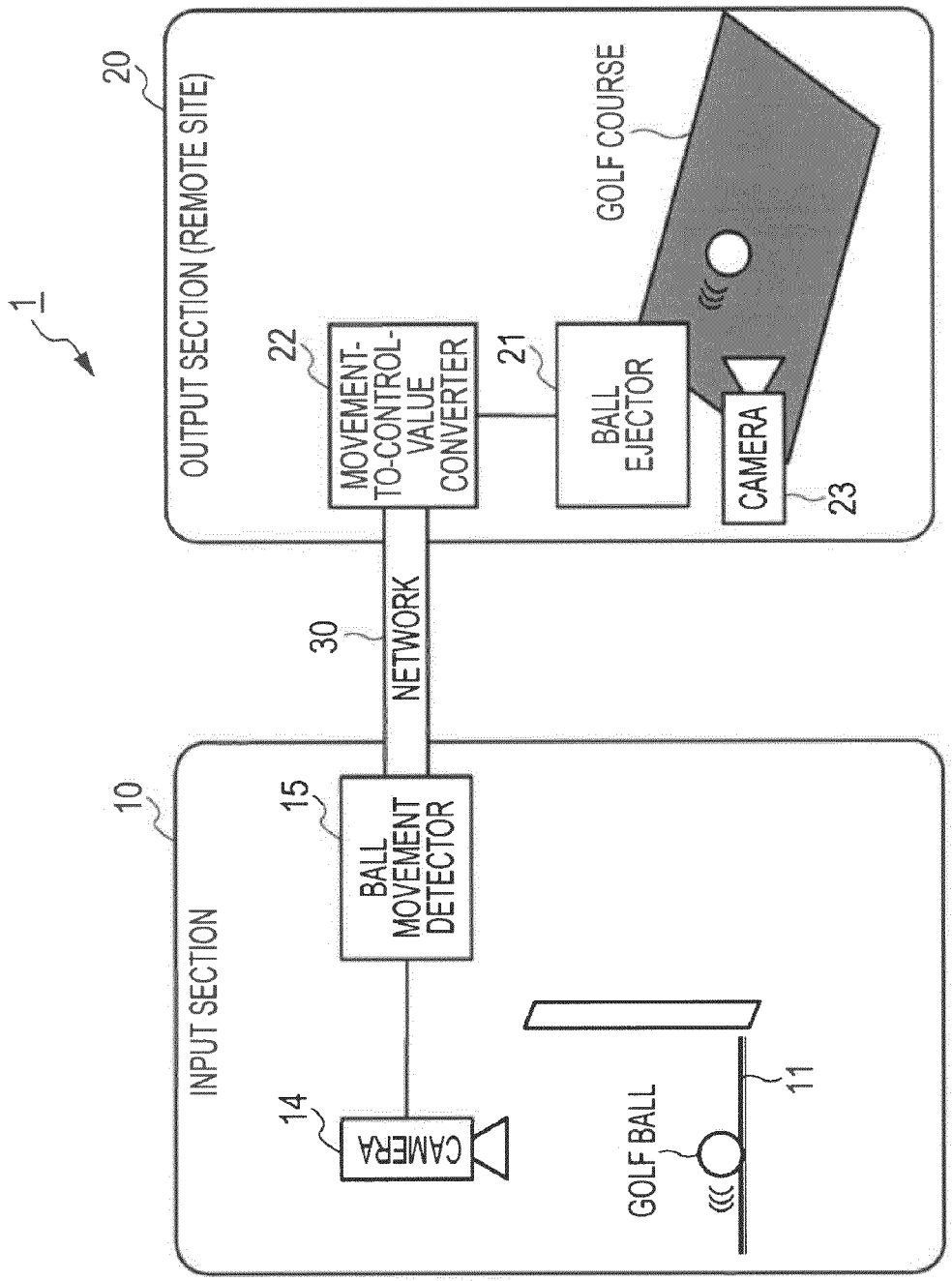
FIG. 1 is a schematic view of an information processing system according to an embodiment of the present invention that captures a user operation and transfers data so as to perform, in a remote site, a remote operation corresponding to the user operation.

FIG. 1 is a schematic view of an information processing system according to an embodiment of the present invention that captures a user operation and transfers the data so as to perform a remote operation corresponding to the user operation in a remote site. The information processing system reproduces, in a remote site, the movement of an object caused by an external force that a user applied to the object with a tool. To be specific, the information processing system reproduces, in a remote site such as a real golf course, the movement of a golf ball when a user performed a golf swing such as a putt.

An information processing system 1 shown in FIG. 1 includes an input section that inputs a user operation, a transmitter that transmits data for the user operation, and an output section that performs a remote operation on the basis of the data for the user operation obtained through the transmitter. The input section corresponds to a local operation environment 10 where a user hits a golf ball with a golf club. The output section corresponds to a remote site 20 where a golf ball is ejected onto a real golf course in accordance with the hitting operation by the user. The operation environment 10 is usually disposed in a room.

The transmitter, which transmits the data for the user operation from the operation environment 10 to the remote site 20, corresponds to a network 30. The network 30 includes a wired network, a wireless network, or a combination of wired and wireless networks. The size of the network depends on the distance between the operation environment 10 and the remote site 20. For example, existing wide-area transmission media, such as the Internet or a public telephone network, can be used as the network 30.

Figure 2:
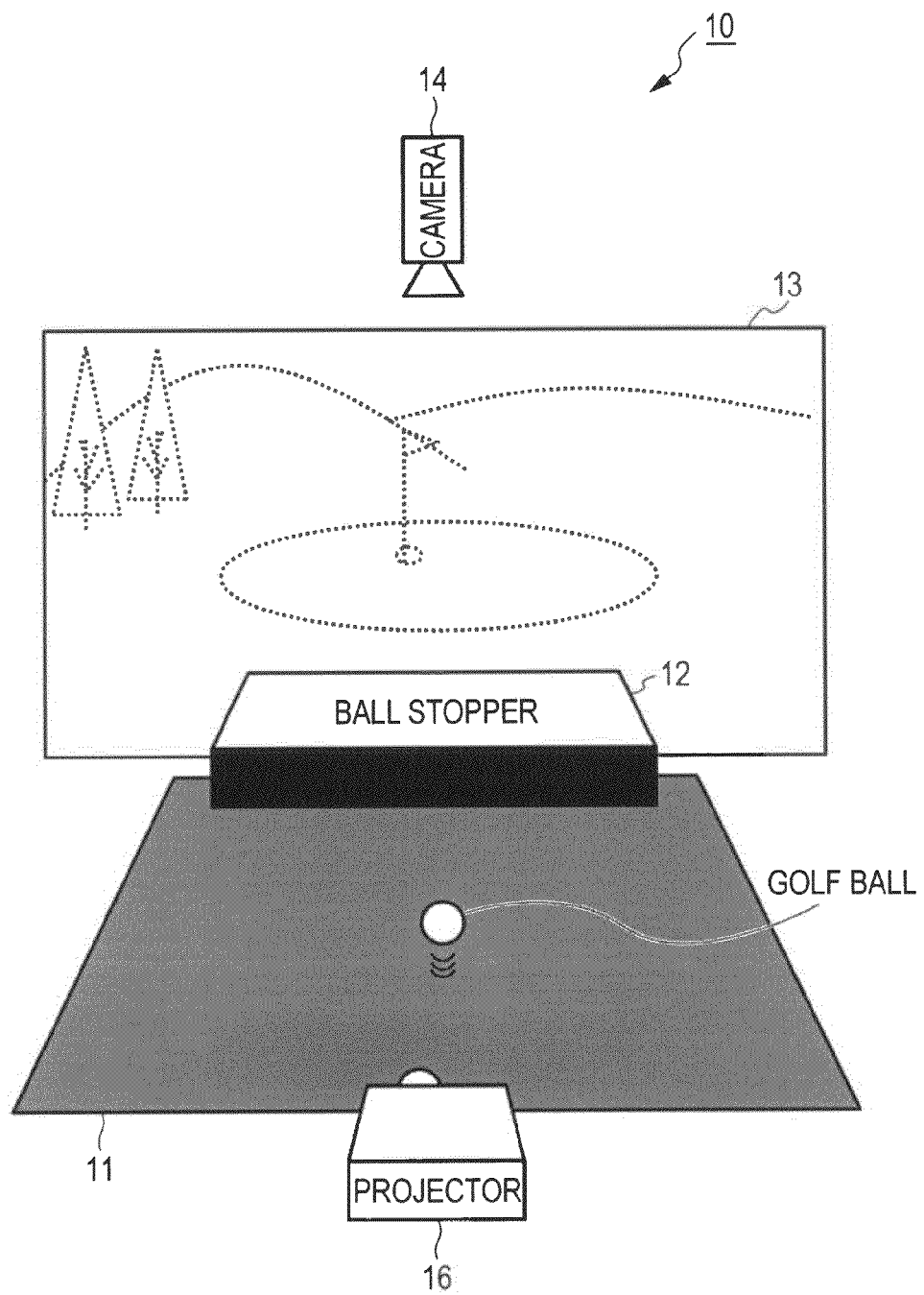
FIG. 2 shows an example of an operation environment disposed in a room.

FIG. 2 shows an example of the operation environment 10 disposed in a room. The operation environment 10 includes artificial turf 11 laid on a floor on which a user hits or putts a golf ball, a ball stopper 12 that retrieves a golf ball that moves substantially forward after being hit by the user on the artificial turf 11, a projector 16 and a projection screen 13 for showing the landscape of a remote site (such as a golf course) to the user, a camera 14 that takes images of the golf ball hit by the user from above and that may be suspended from the ceiling, and a ball movement detector 15 that analyzes moving images taken by the camera 14 so as to obtain movement information of the golf ball.

Images projected onto the projection screen 13 are images of the landscape of a real golf course. It is preferable that the images be real-time images of the landscape supplied from a camera (described below) that takes images of the remote site 20.

The ball movement detector 15 obtains movement information including the speed and direction (movement direction) of a golf ball, which is rolling after being hit with a golf club, by using moving images taken by the camera 14, and transmits the movement information to the remote site 20 via the network. The ball movement detector 15 includes a network communication interface. Data processing performed by the ball movement detector 15 is described below.

FIG. 3 shows an example of the remote site 20 that is, for example, a real golf course. The remote site 20 includes a ball ejector 21 that is disposed, for example, on a green and ejects a golf ball; a movement-to-control-value converter 22 that converts movement information, which has been received from the ball movement detector 15 via the network 30, to a control value for the ball ejector 21; and a camera 23 that takes images of the landscape of the golf course that would be seen by a user, if the user were on the golf course. The movement-to-control-value converter 22 includes a network communication interface.

Images taken by the camera 23 are used as image data for projecting the images onto the projection screen 13 in the operation environment 10. The images are provided to the operation environment 10 via the network 30 and projected onto the projection screen 13 with the projector 16. A user can enjoy playing golf in the operation environment 10 while seeing the images on the projection screen 13 and imagining as if he/she were in a remote site that is a golf course.

Figure 4A:
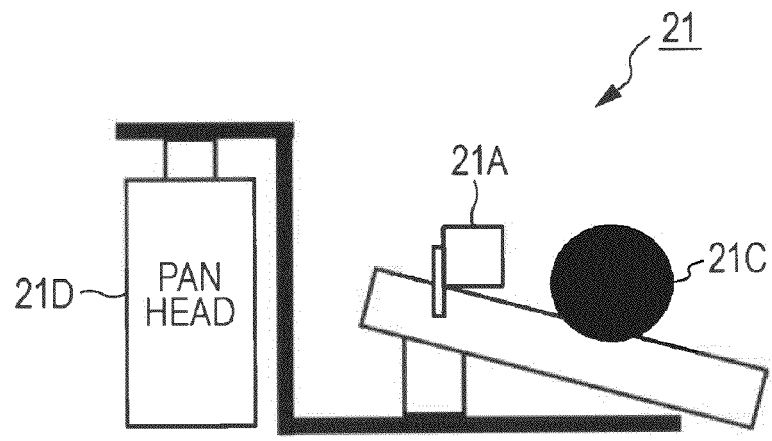
FIG. 4A is a side view of a ball ejector.
Figure 4B:
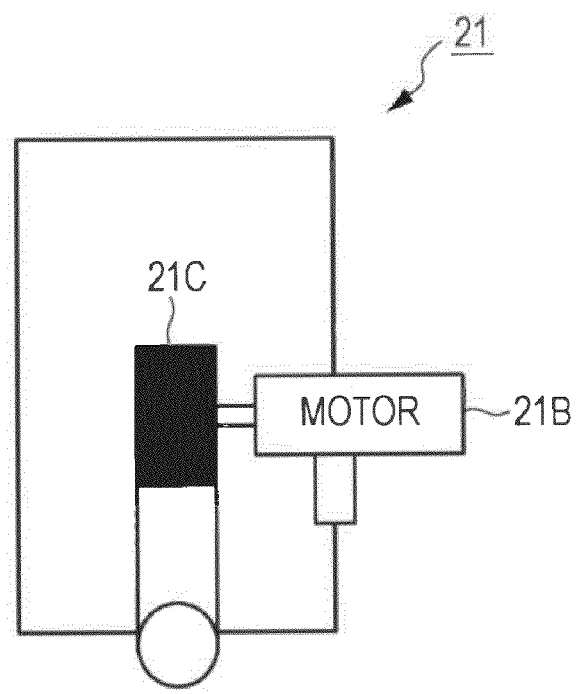
FIG. 4B is a front view of a ball ejector.

FIGS. 4A and 4B respectively show a side view and a front view of the ball ejector 21. As shown in the figures, the ball ejector 21 includes a launcher. The launcher includes a stopper 21A that stops a golf ball (not shown) and a rubber tire 21C that is driven by a motor 21B so as to apply an ejection force to the golf ball. The launcher is mounted on a pan head 21D.

The ball ejector 21 operates in accordance with a control value supplied from the movement-to-control-value converter 22. The ball ejector 21 sets a launching direction of the golf ball using the pan head 21D and controls the rotation speed of the rubber tire 21C in accordance with the speed of the golf ball. When the stopper 21A releases the golf ball, the motor 21B rotates the rubber tire 21C and provides a circumferential speed to the golf ball so as to launch the golf ball. Thus, the golf ball is ejected onto a real golf course (for example, on a green) at substantially the same speed and in substantially the same direction as the movement of a golf ball hit by the user in the operation environment 10.

Figure 5:
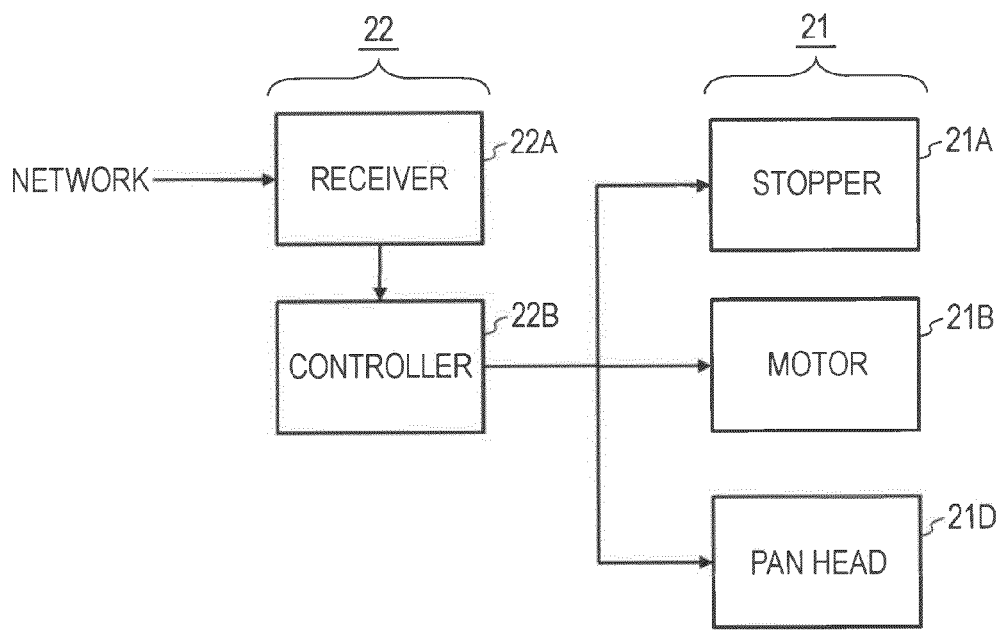
FIG. 5 is a functional block diagram of a ball ejector and a movement-to-control-value converter disposed in a remote site.

FIG. 5 is a functional block diagram of the ball ejector 21 and the movement-to-control-value converter 22 disposed in a remote site.

The movement-to-control-value converter 22 includes a receiver 22A and a controller 22B. Upon receiving movement information of a golf ball via the network, the controller 22B analyzes the movement information. Then, the controller 22B issues a direction command value to the pan head 21D, a rotation speed command value to the motor 21B, and a golf ball release command to the stopper 21A at a predetermined timing.

Figure 6:
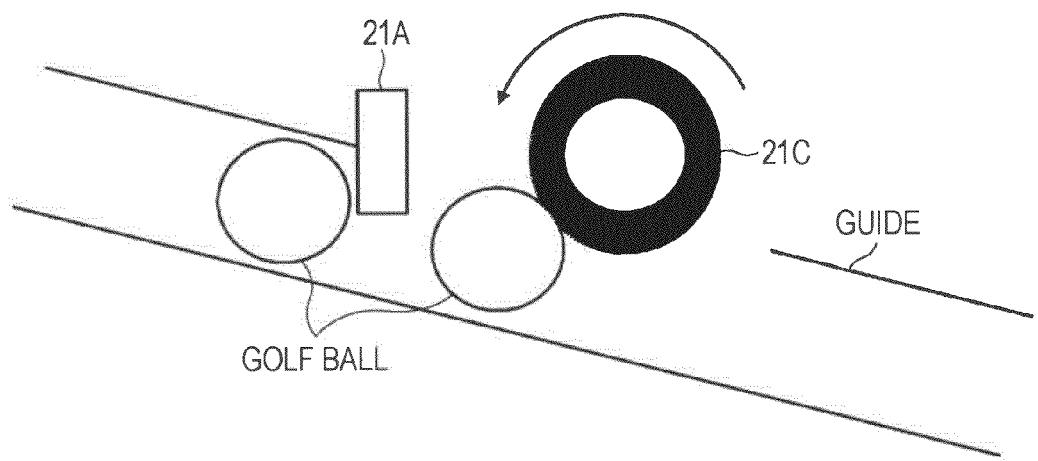
FIG. 6 shows the structure of a main internal part of a launcher that launches a golf ball to the outside.

FIG. 6 shows the structure of a main internal part of a launcher that launches a golf ball to the outside. In an example shown in the figure, the golf ball rolls down the inner periphery of a guide having a cylindrical shape until the ball is stopped by the stopper 21A. When movement information of a golf ball arrives from the operation environment 10, the motor 21B is started so as to rotate the rubber tire 21C. The rotation speed of the rubber tire 21C can be controlled in accordance with the speed of the golf ball. Moreover, the pan head 21D (not shown in FIG. 6) rotates so that the axis direction of the cylindrical guide becomes the same as the direction included in the movement information. When the rotation of the rubber tire 21C has been made constant, the stopper 21A releases the golf ball and the motor 21B rotates the rubber tire 21C so as to provide the outer periphery of the golf ball with a circumferential speed and launch the golf ball. Thus, a golf ball can be ejected onto a real golf course (for example, on a green) at substantially the same speed and in substantially the same direction as the movement of a golf ball hit by a user in the operation environment 10. Speed control of the golf ball by using the rotation of the rubber tire 21C is performed simultaneously with ejection direction control of the golf ball with the pan head 21D.

As described above, the rotation speed of the rubber tire 21C is controlled in accordance with the speed of the golf ball. However, a problem exists in that it is difficult to launch the golf ball at a speed equal to or less than the lower limit of the rotation speed of the motor 21B. For example, when a user putts a golf ball, the speed of the golf ball may be equal to or less than the lower limit.

In such a case, by controlling a timing at which the stopper 21A releases the golf ball while the rubber tire 21C is being rotated by residual rotation of the motor 21B, the golf ball can be launched at a speed equal to or less than the lower limit. For this purpose, the motor 21B is first rotated at a constant speed, then power supply to the motor 21B is stopped, and then the golf ball is launched by utilizing residual rotation that is dependent on the time elapsed before the stopper 21A releases the golf ball, so that the golf ball can be ejected at a speed equal to or less than the lower limit.

Figure 7:
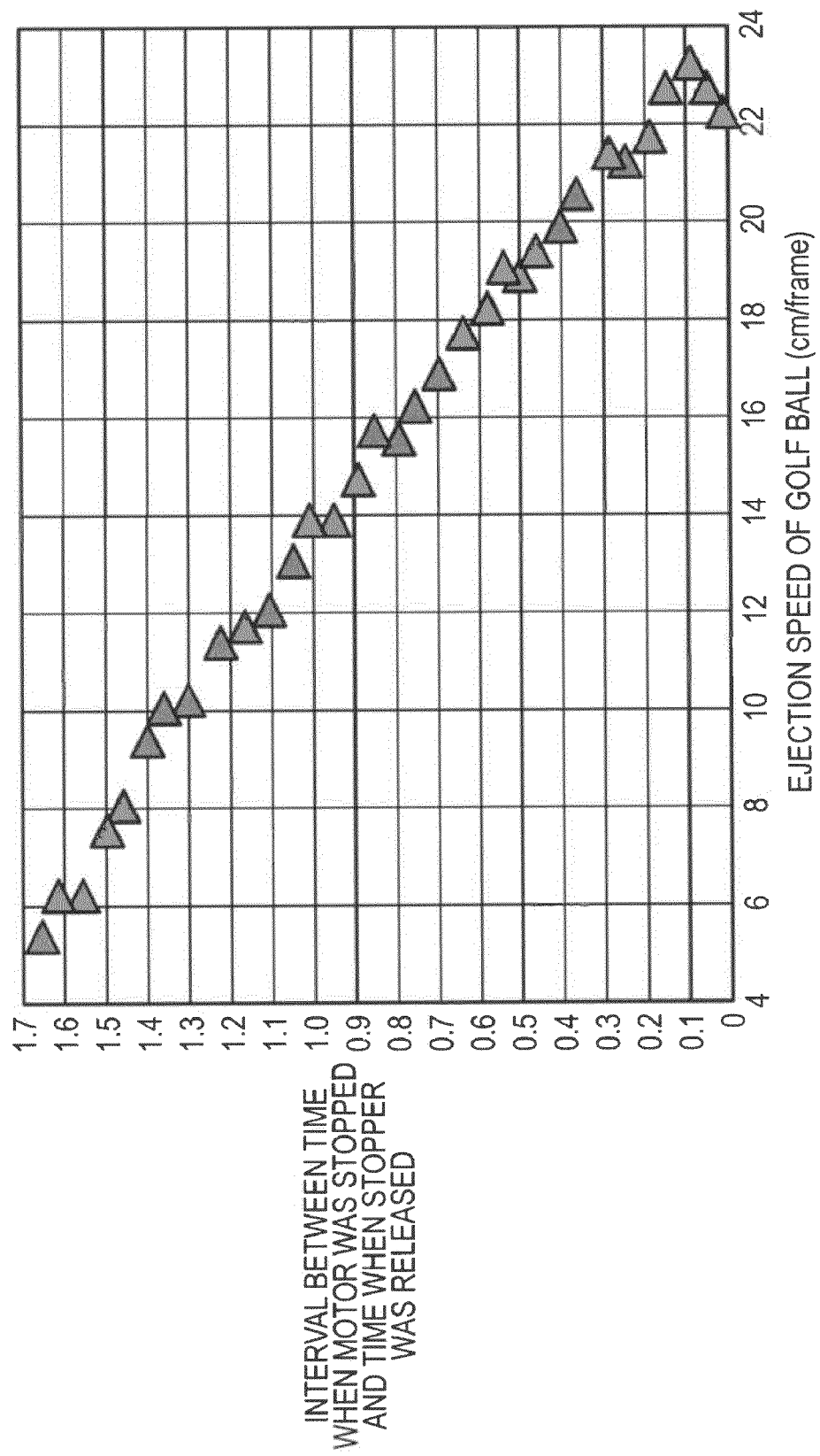
FIG. 7 is a graph showing a relationship between the speed of a golf ball that has been launched and an interval between the time when rotation of a motor was stopped and the time when a stopper released a golf ball.

FIG. 7 is a graph showing a relationship between the speed of a golf ball that has been launched and an interval between the time when the rotation of the motor 21B was stopped and the time when the stopper 21A released the golf ball. As shown in FIG. 7, there is a substantially linear relationship between the speed of the golf ball and the time elapsed after the motor 21B was stopped. Therefore, least square approximation can be applied to this relationship so as to obtain, by inputting a desired launching speed, an appropriate timing for releasing the stopper 21A.

Next, an operation performed by the ball movement detector 15 in the operation environment 10 is described.

As described above, the artificial turf 11 is laid on a floor in the operation environment 10, which is usually disposed in a room. A user hits or putts a golf ball disposed on the artificial turf 11. The camera 14 is disposed on the ceiling and points toward the floor so as to take images of the golf ball hit by the user from above. The ball movement detector 15 applies image signal processing to moving images taken by the camera 14 so as to extract the speed and direction of the golf ball.

Figure 8:
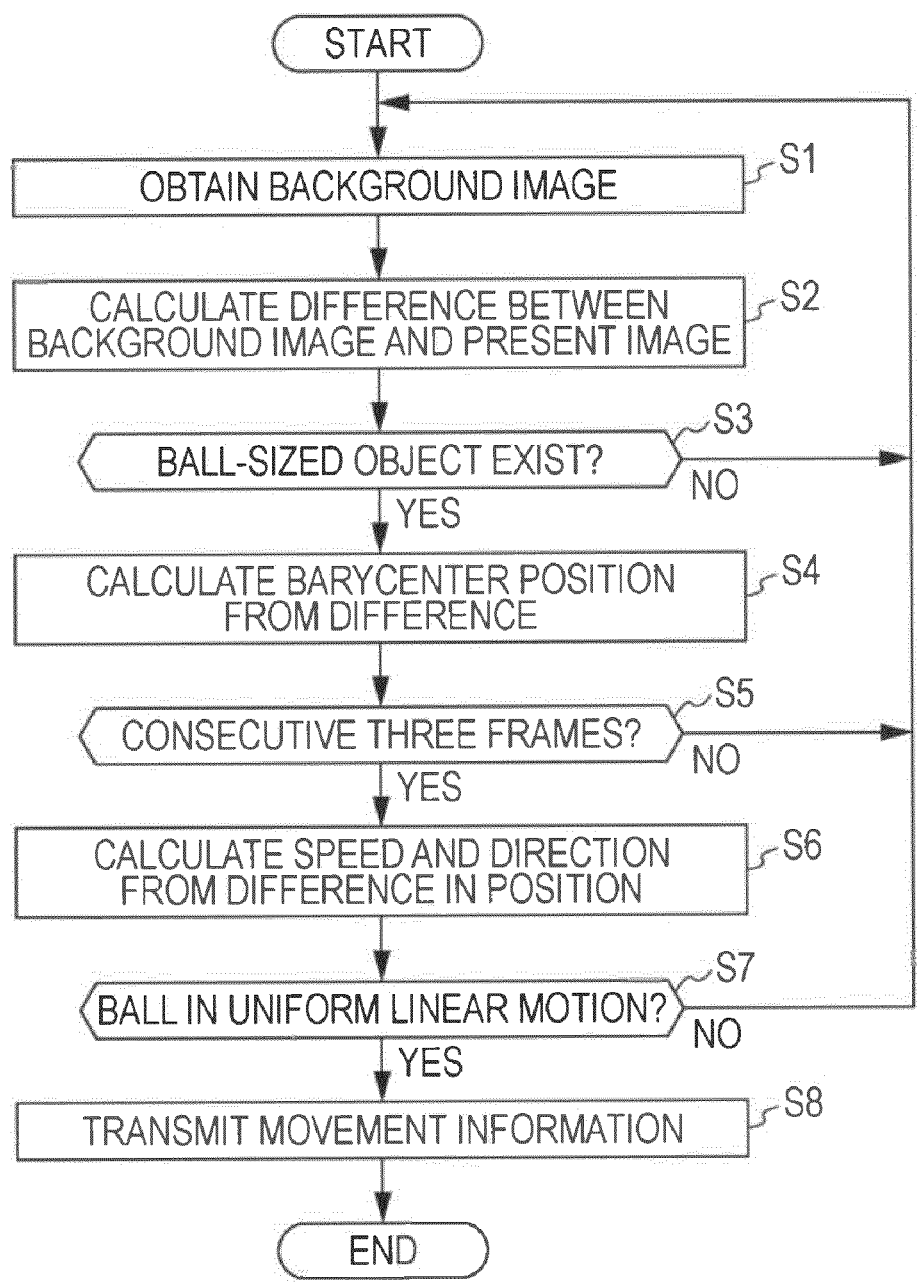
FIG. 8 is a flowchart showing a process in which a ball movement detector extracts the speed and direction of a golf ball.

FIG. 8 is a flowchart showing an image signal processing process in which the ball movement detector 15 extracts the speed and direction of a golf ball.

First, a background image (that is, an image showing only the artificial turf 11 laid on the floor) at a certain time is obtained (step S1).

Figure 9A:
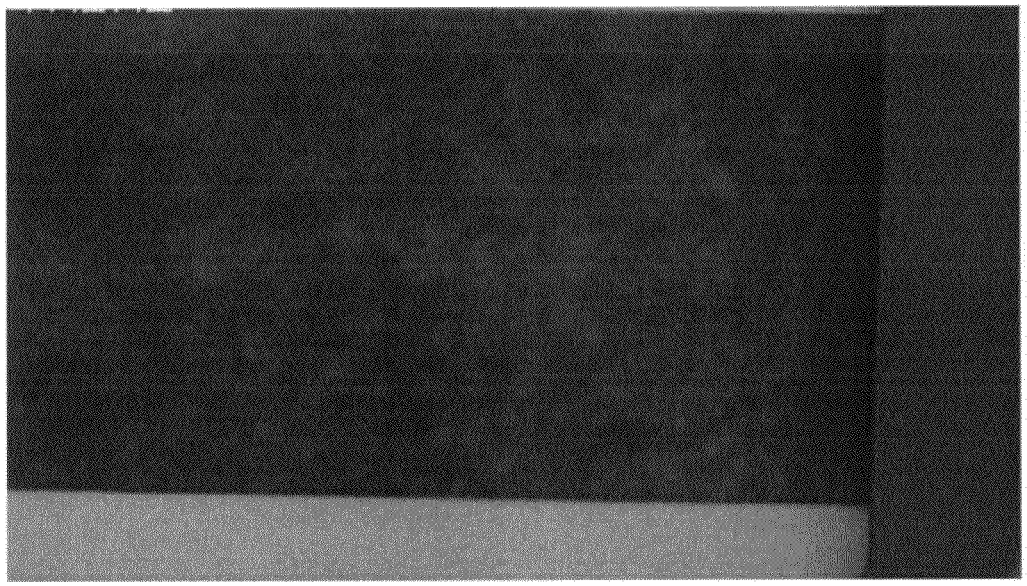
FIG. 9A shows an example of a background image of a floor (artificial turf) that was taken by a camera at a certain time.
Figure 9B:
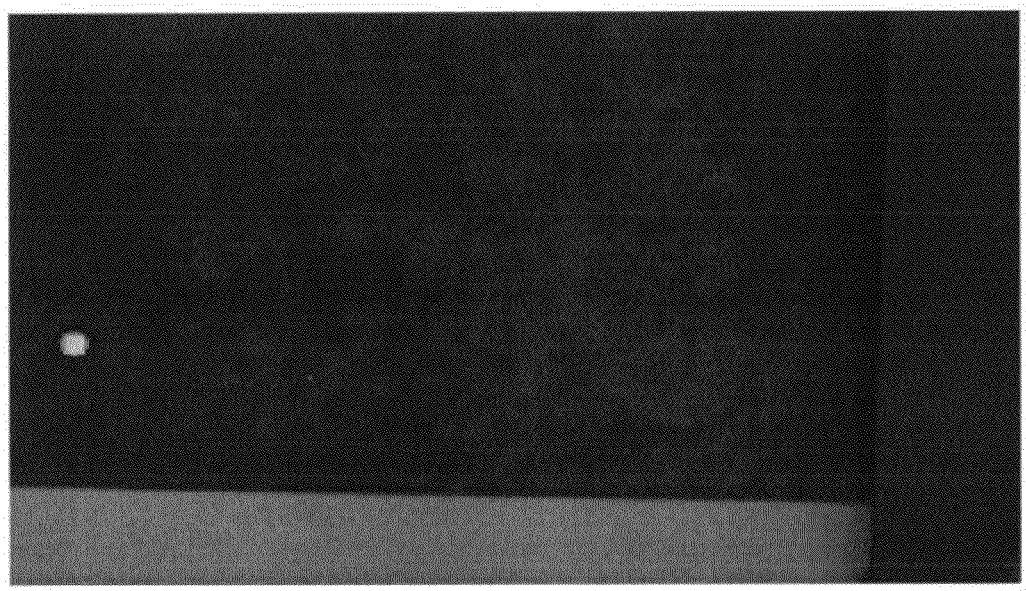
FIG. 9B shows an example of a background image of a floor (artificial turf) that is taken by a camera at the present time.

Next, a difference signal between the background image (see FIG. 9A) and the image at the present time (see FIG. 9B) is calculated (step S2) so as to detect the position of the golf ball.

In order to prevent erroneous detection of the position of the golf ball, the following process is performed.

(2-1) Since a golf ball is usually white, an area where the difference signal is equal to or greater than a threshold in terms of brightness is detected. (2-2) The area is divided into regions that are contiguous with each other. (2-3) Among such regions, those regions having outer peripheries that can be surrounded by rectangles close to being squares and having areas close to the size of the golf ball are extracted as images of the golf ball.

Figure 10:
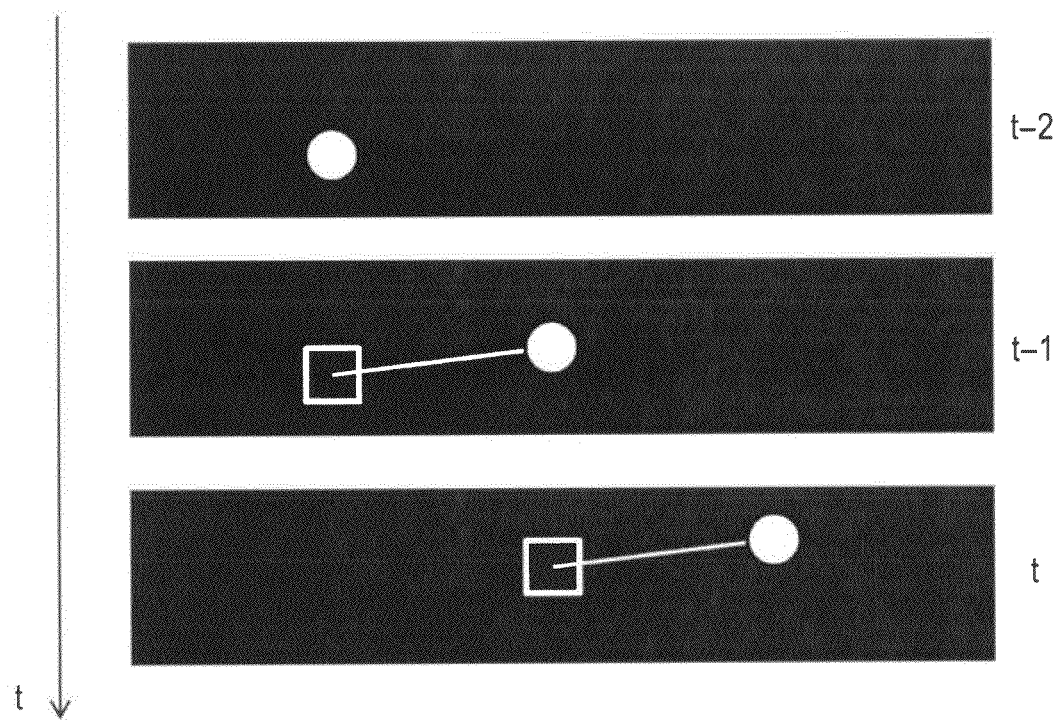
FIG. 10 shows three consecutive frames of images with which it is determined that a ball-sized object exists.

When it is determined that a golf ball-sized object exists in the images ("YES" in step S3), a process for detecting the movement of the golf ball by using three consecutive frames of taken images (see FIG. 10) is started.

In the detection process, the barycenter of the ball in the frames are detected first (step S4). The barycenter is determined as the center of a rectangle made by filling the region where differences between the background image and the present image of consecutive frames are continuous.

If three or more consecutive frames of images including golf ball-sized objects are not available ("No" in steps S5), the barycenter is undetectable. In this case, detection of a golf ball is re-tried from step S2.

On the other hand, if three or more consecutive frames of images including golf ball-sized objects are available ("YES" in steps S5), the displacement (speed) and the direction of the barycenter of the golf ball is calculated using subsequent frames (step S6).

If the displacement and the direction of the barycenter of the golf ball between time t−2 and time t−1 are substantially the same as the displacement and the direction of the barycenter of the golf ball between time t−1 and time t, it is determined that the golf ball that is moving after being hit or putted has been successfully detected ("YES" in step S7). In other words, the determination is made only when the golf ball detected by using the three consecutive frames is undergoing uniform linear motion. In this case, the ball movement detector 15 calculates movement information including the speed and direction of the detected golf ball and transmits the movement information to the movement-to-control-value converter 22 in the remote site 20 via the network 30 (step S8).

The speed of the golf ball is calculated by converting the number of pixels by which the golf ball has moved per frame into centimeters by using the ratio of the diameter of the golf ball to the size of a pixel. That is, a real distance obtained from the size of the golf ball, such as displacement per frame (cm/frame), is used as a unit. Thus, the unit does not depend on the position of the camera 14 disposed on the ceiling.

When the golf ball detected from three consecutive frames is not undergoing uniform linear motion ("NO" in step S7), the ball is undetectable, and the detection of a golf ball is re-tried from step S2.

Next, an operation performed by the ball ejector 21 in the remote site 20 is described.

As described above, the launcher is mounted on the pan head 21D, which provides a golf ball with an ejection direction. The launcher includes the stopper 21A, which stops the golf ball, and the rubber tire 21C. The rubber tire 21C is rotated by the motor 21B so as to provide the outer periphery of the golf ball with a circumferential speed and launch the golf ball to the outside.

Figure 11:
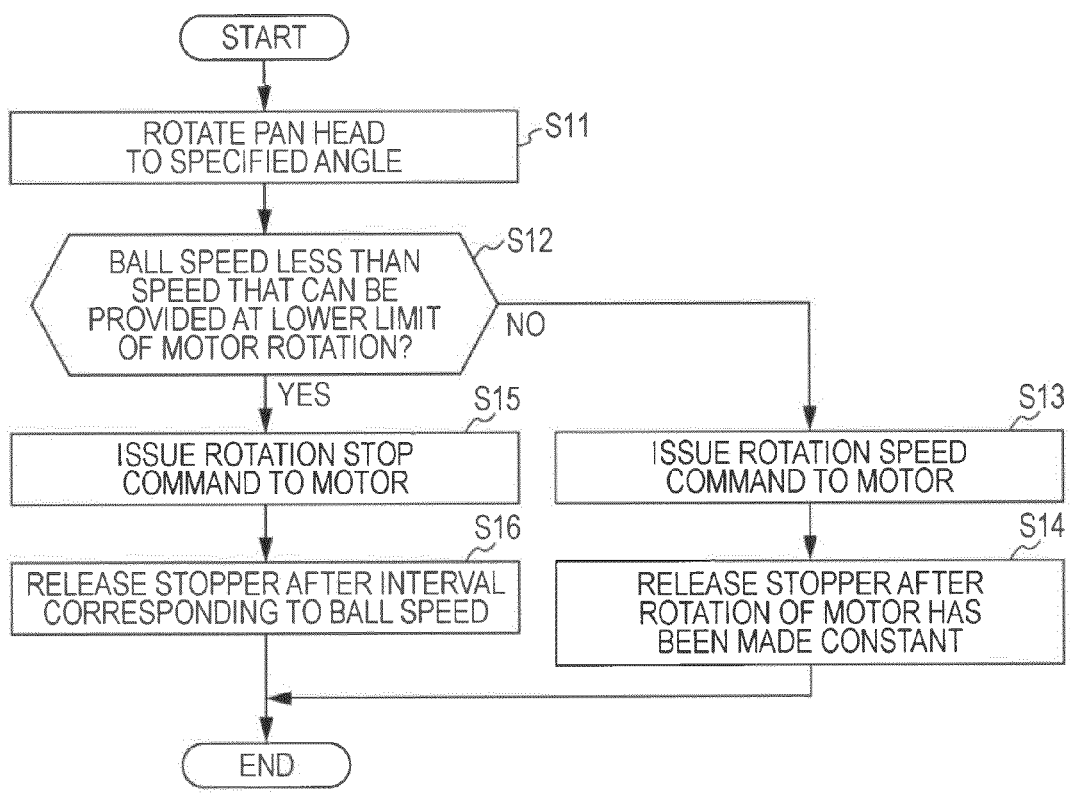
FIG. 11 a flowchart showing a process in which a movement-to-control-value converter controls the ball ejector in accordance with movement information.

FIG. 11 a flowchart showing a process in which the movement-to-control-value converter 22 controls the movement of the ball ejector 21 in accordance with movement information.

Upon receiving movement information via the network, the movement-to-control-value converter 22 analyzes the movement information so as to obtain information of the speed and direction with which the golf ball is to be ejected. Then, a direction command value is issued to the pan head 21D (step S11).

The movement-to-control-value converter 22 examines whether or not the rotation speed of the motor 21B corresponding to the ejection speed of the golf ball is less than the lower limit of the rotation speed of the motor 21B (step S12).

Step S11 and step S12 are simultaneously performed.

If the rotation speed of the motor 21B corresponding to the ejection speed of the golf ball is equal to or greater than the lower limit of the rotation speed of the motor 21B ("NO" in step S12), the movement-to-control-value converter 22 issues a rotation speed command, which has been obtained by analyzing the movement information, directly to the motor 21B (step S13), and issues a golf ball release command to the stopper 21A at a timing when the rotation speed has been made constant (step S14). As a result, the golf ball can be ejected onto a real golf course (for example, on a green) at substantially the same speed and in substantially the same direction as the movement of a golf ball hit by a user in the operation environment 10.

On the other hand, when the rotation speed of the motor 21B corresponding to the launching speed of the golf ball is less than the lower limit of the rotation speed of the motor 21B ("YES" in step S12), the movement-to-control-value converter 22 issues a rotation command to the motor 21B and then issues a rotation stop command (step S15). Then, when the residual rotation of the motor 21B decelerates to a speed corresponding to a desired speed of the golf ball, the movement-to-control-value converter 22 issues a golf ball release command to the stopper 21A (step S16). Thus, by launching the golf ball with the residual rotation of the motor that is dependent on the time elapsed before the ball is dropped, the golf ball can be launched on a real golf course (for example, on a green) at substantially the same speed and in substantially the same direction as the movement of a golf ball hit by a user in the operation environment 10.

Heretofore, an embodiment that reproduces, in the remote site 20 such as a golf course, a movement of a golf ball caused by a golf swing performed by a user in the operation environment 10 such as in a room has been described. However, the present invention is not limited thereto.

For example, "air hockey" is a popular arcade game, in which players hit a plastic disc (puck) on a table with a tool called a "mallet" (or a "smasher") so as to score goals by hitting the puck into the opponent's goal. Numerous tiny holes are made in a surface of the table, so that a puck floats on air that is blown out of the tiny holes. When the puck is hit with a mallet, the puck slides on the table with low friction, and rebounds when the puck hits a peripheral frame of the table. As the name implies, air hockey is a game that simulates hockey. The table is divided into the player's side and the opponent's side by a center line disposed in the middle of long sides. Comparatively large openings, which serve as goals, are made in both short sides of the table. When a player hits a puck into an opponent's goal, the player gets a goal.

The remote technology according to an embodiment of the present invention can be applied to air hockey. In a game in which a player competes against an opponent, a player's side corresponds to a local operation environment and an opponent's side corresponds to a remote site. On the player's and opponent's sides, input and output sections for both the player and the opponent are disposed, so that the system has a symmetrical structure.

Figure 12:
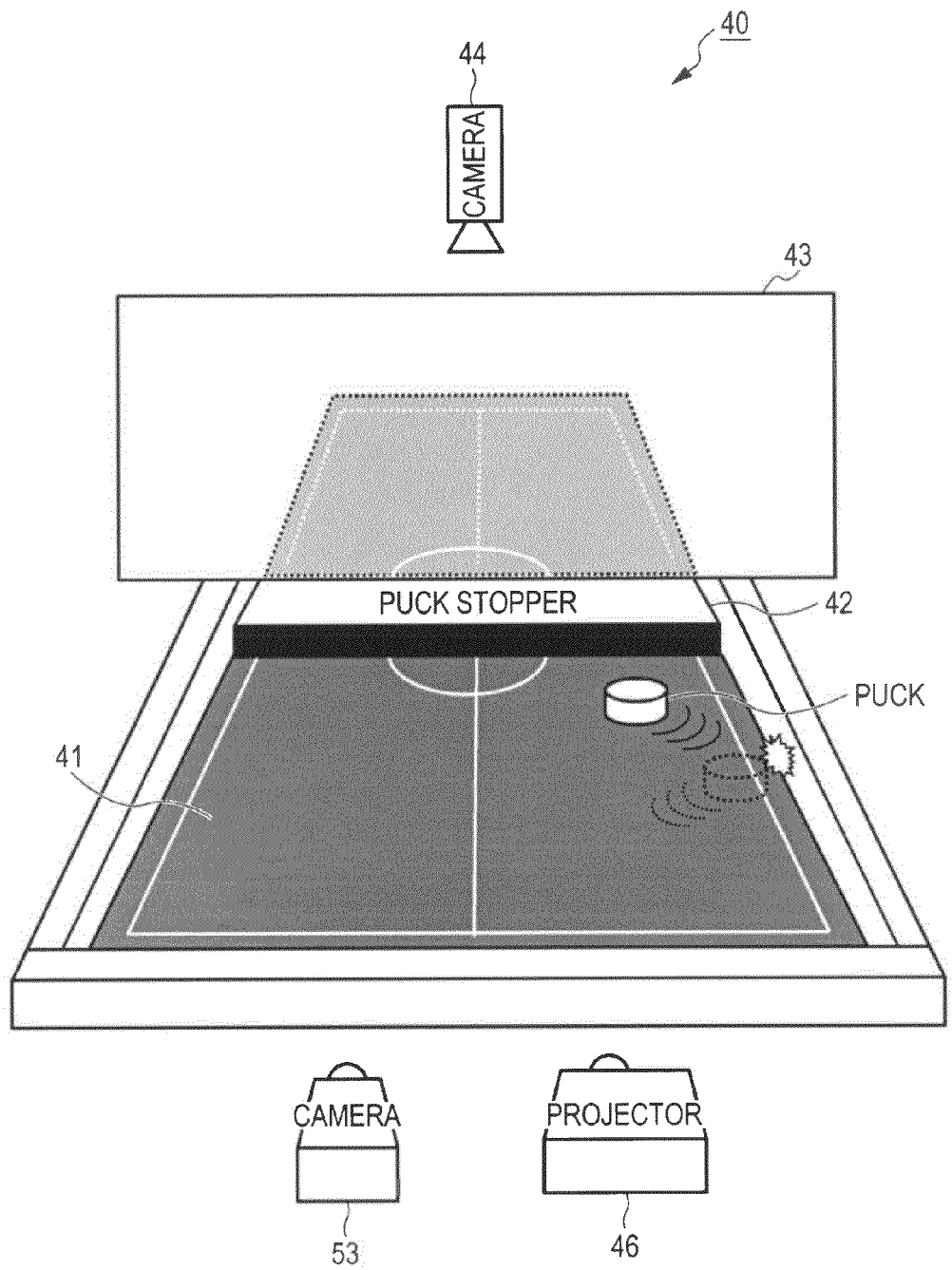
FIG. 12 is a schematic view showing an information processing system according to an embodiment of the present invention, which is applied to air hockey.

FIG. 12 is a schematic view showing an information processing system in which the present invention is applied to air hockey. Since the player's side and the opponent's side are symmetric as described above, only a player's side 40 corresponding to an input section is shown in FIG. 12.

In the upper surface of a half-sized table 41 having only the player's side 40 as shown in FIG. 12, numerous tiny holes (not shown) are made so that puck can float on air that is blown out of the tiny holes. At a proximal end of the table 41 on the player's side 40, an opening (not shown), which serves a goal on the player's side, is disposed as in an ordinary air hockey table. On a distal side of the table 41 opposite the player's side 40, a puck stopper 42 is disposed. The puck stopper 42 retrieves a puck hit with a mallet (not shown) toward the opponent's side. In the embodiment, a puck ejector (described below) is disposed in the puck stopper 42.

Moreover, on a distal end of the table 41 opposite the player's side 40, a projection screen 43 is disposed. Images of the opponent's side taken by a camera disposed on the opponent's side in the remote site is projected onto the projection screen 43 by a projector 46. A camera 53 that takes images of the player's side 40 is disposed on the player's side. Image signals of images of the player's side are provided to a projector on the opponent's side via a network, so that the images of the player's side 40 are likewise projected onto a projection screen on the opponent's side in the remote site.

A camera 44 suspended from the ceiling takes images of the table 41 on the player's side 40 from above. By applying signal processing to the images including images of a puck that a user hits with a mallet, movement information of the puck including the speed and direction (angle) of the puck can be obtained. Then, the movement information of the puck is transmitted to a puck ejector on the opponent's side via the network.

When a puck hit from the player's side 40 is retrieved by the puck stopper 42, the puck is supplied to the puck ejector. On the basis of movement information of a puck supplied from the opponent's side, the puck ejector ejects the puck to the player's side 40 at substantially the same speed and in substantially the same direction as the speed and direction at which the opponent hit a puck with a mallet on the opponent's side.

Figure 13:
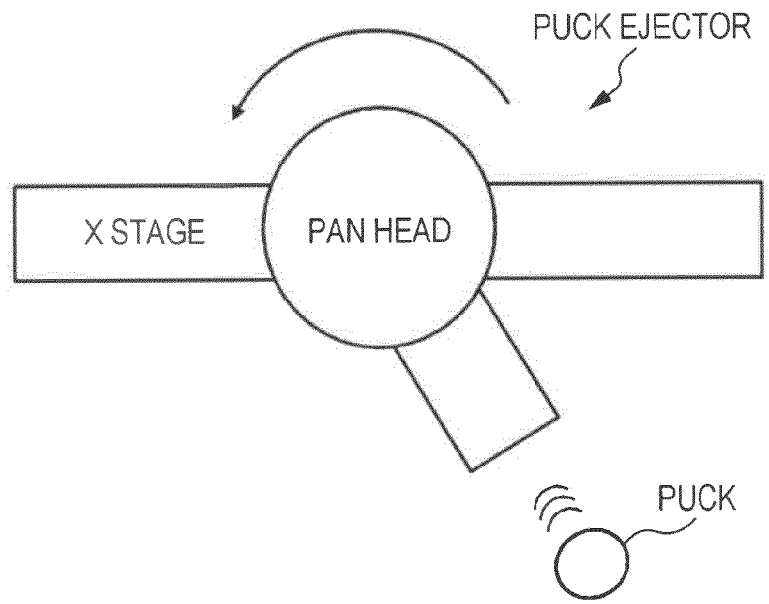
FIG. 13 shows the structure of a main part of a puck ejector.

FIG. 13 shows the structure of a main part of the puck ejector. A launcher (as described above, see FIG. 4) of a puck is mounted on a pan head, and the pan head is mounted on an X stage so that the launcher can move in X direction. The launcher allows control of the speed and direction of the puck, and the X stage allows setting of a launch position in X direction. The X stage moves the puck ejector to a position at which a puck is trapped by the puck stopper on the opponent's side. Then, the puck ejector ejects a puck at the same speed and in the same direction as the speed and direction of the puck trapped by the puck stopper on the opponent's side.

The puck launcher has the structure similar to that of the golf ball launcher shown in FIG. 6, although the illustration of the puck launcher is omitted. That is, a puck retrieved from the player's side is stopped by a stopper, a motor rotates a rubber tire at a speed corresponding to the speed of the puck, drop the puck by releasing the stopper when the rotation is made constant, so that the puck can be ejected in a direction set by the pan head and at a desired speed to the outside, that is, to the player's side.

Figure 14:
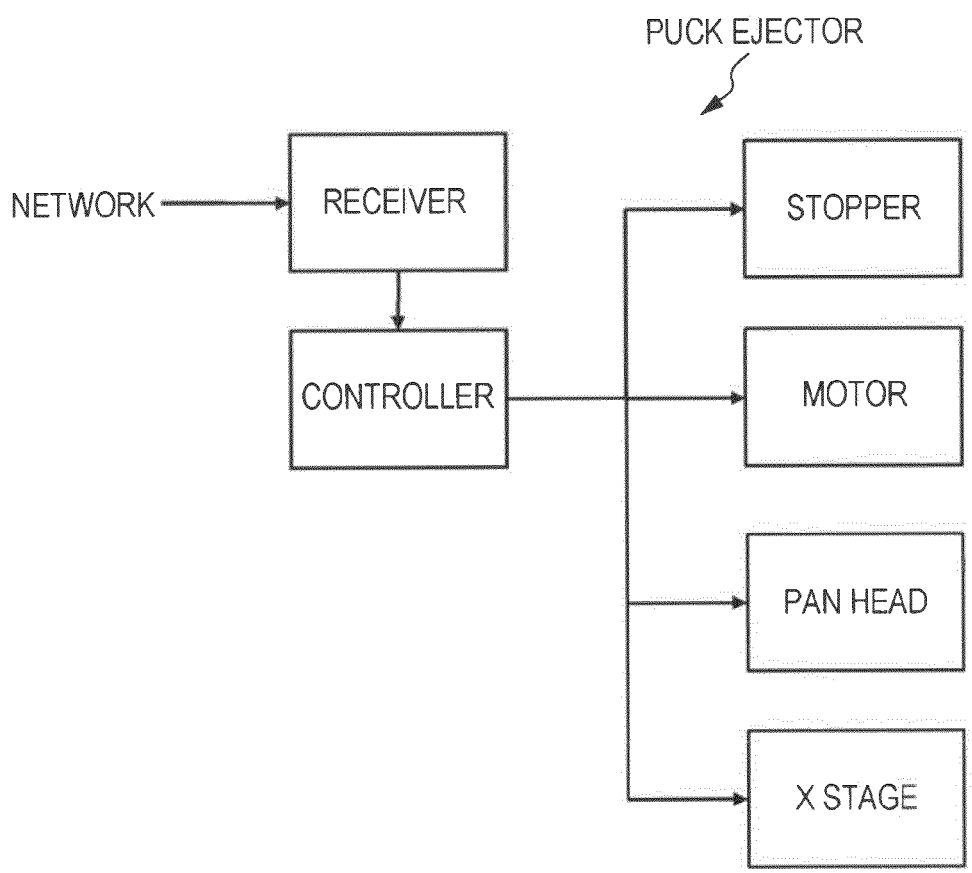
FIG. 14 is a block diagram of a main part of a puck ejector.

FIG. 14 is a block diagram of a main part of the puck ejector.

The puck ejector includes a receiver, a controller, a puck launcher having a motor that rotates a rubber tire and a stopper that stops the puck, a pan head that rotatably supports the puck launcher, and an X stage that movably supports the pan head.

When the receiver receives movement information of a puck that has been trapped in the puck stopper in the opponent's side via the network, the controller analyzes the movement information and issues a position command value to the X stage, a direction command value to the pan head, a rotation speed command value to the motor, and a puck release command to the stopper at a specified timing.

Launch speed control of the puck by using motor rotation, position control of the X stage, and ejection direction control of the pan head for ejecting the puck are simultaneously performed.

As it may happen when the opponent fails to hit a puck on the opponent's side, the speed of the puck may be less than the minimum speed that can be provided at the lower limit of the rotation speed of the motor. In such a case, a speed that is equal to or less than the lower limit can be provided to the puck by utilizing residual rotation of the motor as described above. That is, the motor is first rotated at a certain speed, then driving power to the motor is stopped, and then the puck is launched by utilizing residual rotation that is dependent on a time elapsed before the stopper releases the puck and the puck drops on the rubber tire, so that the puck can be ejected at a speed equal to or less than the lower limit speed.

Figure 15:
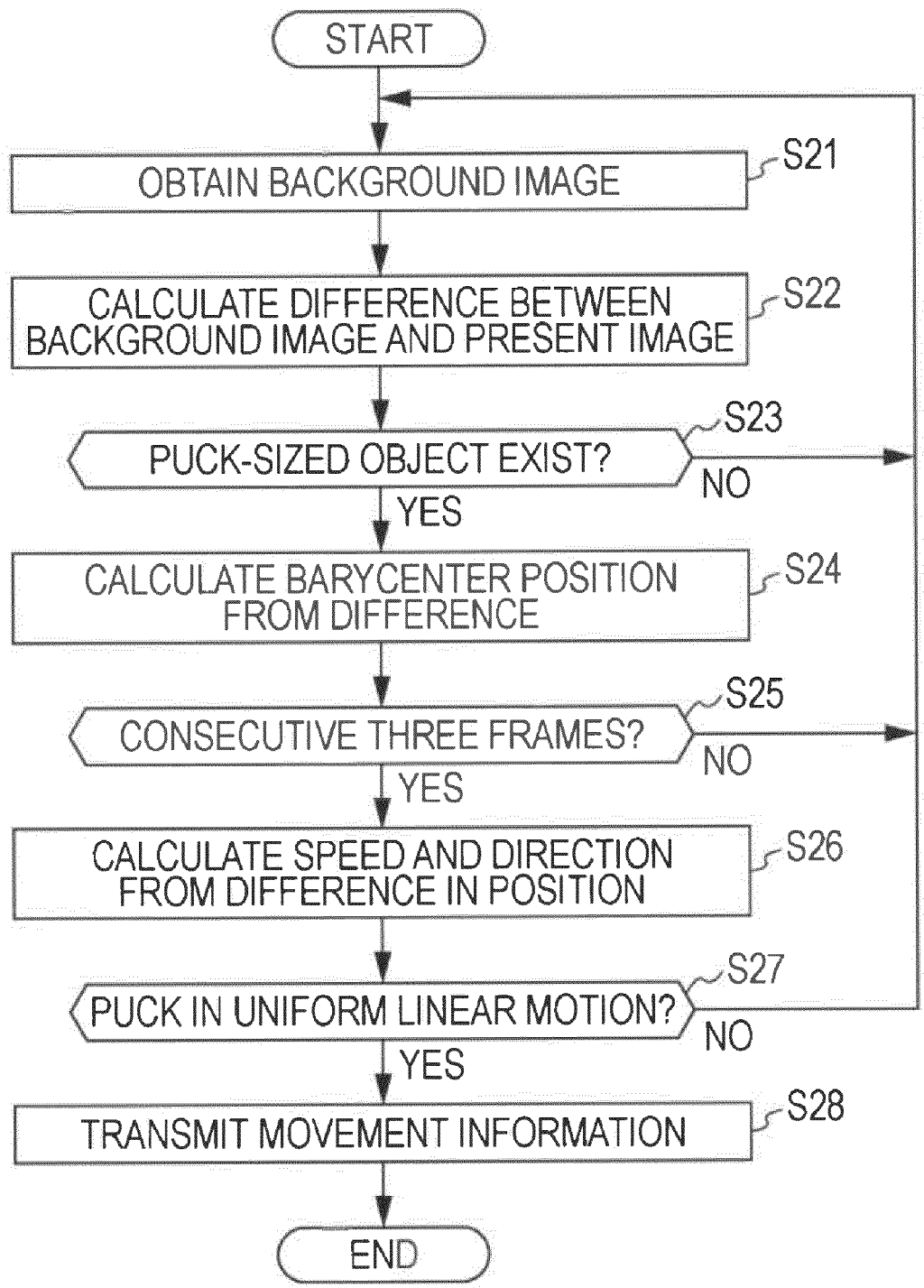
FIG. 15 is a flowchart showing an image signal processing process for extracting the position, the speed, and the direction of a puck that is trapped into a puck stopper on a player's side.

Next, an operation for detecting a movement of a puck, which a player hits with a mallet on the player's side serving as the operation environment, is described. FIG. 15 is a flowchart showing an image signal processing process for extracting the position, the speed, and the direction of a puck that is trapped into a puck stopper on a player's side.

First, a background image (that is, an image showing only the table) at a certain time is obtained (step S21). Next, a difference signal between the background image and the image at the present time including the puck is calculated (step S22) so as to detect the position of the puck.

When it is determined that a puck-sized object exists in the images ("YES" in step S23), a process for detecting the movement of the puck by using three consecutive frames of taken images is started.

In the detection process, the barycenter of the puck in the frames are detected first (step S24). The barycenter is determined as the center of a rectangle made by filling the region where differences between the background image and the present image of consecutive frames are continuous.

If three or more consecutive frames of images including puck-sized objects are not available ("No" in steps S25), the barycenter is undetectable. In this case, detection of a puck is re-tried from step S22.

On the other hand, if three or more consecutive frames of images including puck-sized objects are available ("YES" in steps S25), the displacement (speed) and the direction of the barycenter of the puck is calculated using subsequent frames (step S26).

If the displacement and the direction of the barycenter of the puck between time t−2 and time t−1 are substantially the same as the displacement and the direction of the barycenter of the puck between time t−1 and time t, it is determined that the puck, which is moving after being hit with a mallet, has been successfully detected ("YES" in step S27). In other words, the determination is made only when the puck detected by using the three consecutive frames is undergoing uniform linear motion. In this case, movement information of a puck, which is trapped by a puck stopper, including the position in X direction, the speed, and the movement direction of the puck is calculated. Then, the movement information is transmitted via the network to an opponent's side in a remote site (step S28).

The speed of the puck is calculated by converting the number of pixels by which the puck has moved per frame into centimeters by using the ratio of the diameter of the puck to the size of a pixel. That is, a real distance obtained from the size of the puck, such as displacement per frame (cm/frame), is used as a unit. Thus, the unit does not depend on the position of the camera 43 disposed on the ceiling.

When a puck detected from three consecutive frames is not undergoing uniform linear motion ("NO" in step S27), the puck is undetectable, and the detection is re-tried from step S22.

Figure 16:
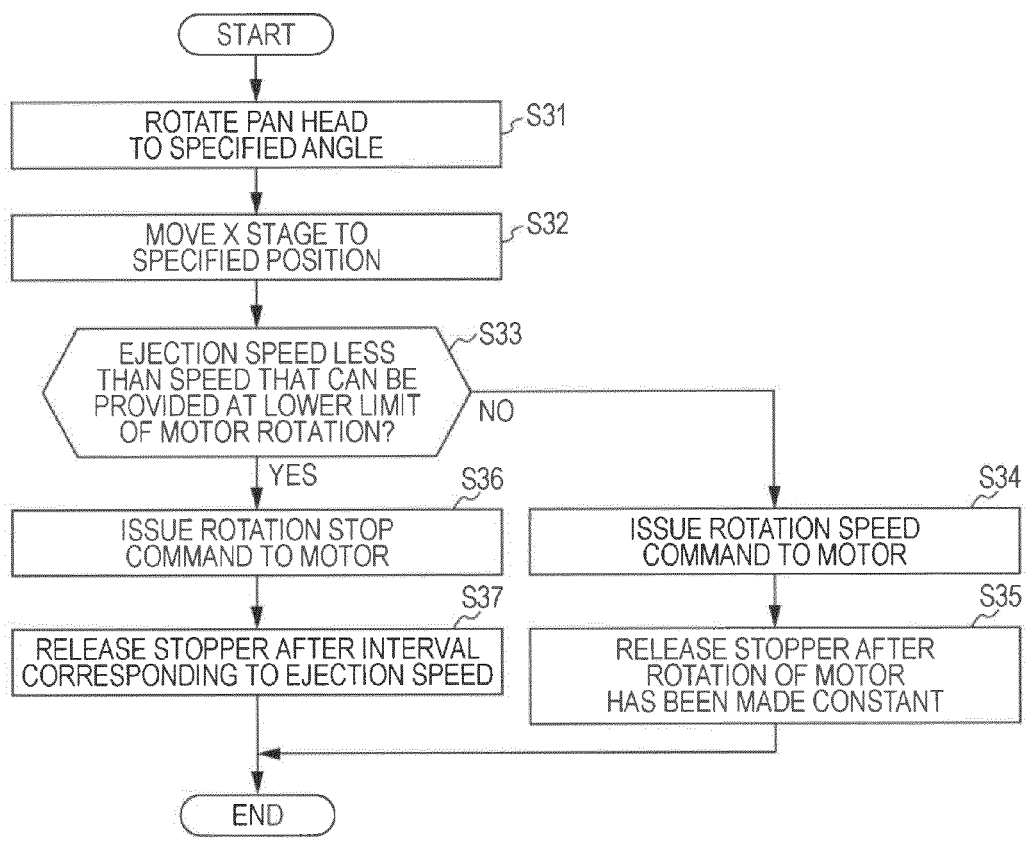
FIG. 16 is a flowchart showing a process for controlling the operation of a puck ejector in accordance with movement information received from an opponent's side.

Next, an operation for ejecting a puck to an opponent's side, which is remote from the player's side 40, is described. This operation corresponds to an operation for launching a puck, which has been retrieved by a puck stopper on a player's side, back to the player's side on the basis of movement information from the opponent's side. FIG. 16 is a flowchart showing a process for controlling the operation of a puck ejector in accordance with movement information received from the opponent's side.

Upon receiving movement information of the puck via the network, the controller analyzes the movement information so as to obtain information including the position in X direction, the speed, and the ejection direction of the puck for ejecting the puck from the puck ejector of the puck stopper. Then, the controller issues a direction command value to the pan head 21D (step S31) and an X-direction position command value to the X stage (step S32).

The controller examines whether or not the rotation speed of the motor corresponding to the ejection speed of the puck is less than the lower limit of the rotation speed of the motor (step S33).

Steps S31 to S33 are simultaneously performed.

If the rotation speed of the motor corresponding to the ejection speed of the puck is equal to or greater than the lower limit of the rotation speed of the motor ("NO" in step S33), the controller issues a rotation speed command, which has been obtained by analyzing the movement information, directly to the motor (step S34), and issues a puck release command to the stopper at a timing when the rotation speed has been made constant (step S35). As a result, the puck can be ejected to the player's side at substantially the same speed and position and in substantially the same direction as the movement of a puck hit by the opponent on the opponent's side in the remote site.

On the other hand, when the rotation speed of the motor corresponding to the ejection speed of the puck is less than the lower limit of the rotation speed of the motor ("YES" in step S33), the controller issues a rotation command to the motor and then issues a rotation stop command (step S36). Then, when the residual rotation of the motor decelerates to a desired ejection speed of the puck, the controller issues a puck release command to the stopper (step S37). Thus, by launching the puck with the residual rotation of the motor that is dependent on the time elapsed before the puck is dropped, the puck can be ejected to the player's side at substantially the same speed and position and in substantially the same direction as the movement of a puck hit by the opponent on the opponent's side in the remote site.

Heretofore, embodiments of the present invention have been described. However, it is self-evident that those skilled in the art can apply modification or substitution to the embodiments within the scope of the present invention.

In this specification, an embodiment that precisely reproduces, on a real golf course (green), a movement of a golf ball that was putted by a user on artificial turf laid in a room has been mainly described. However, the scope of the present invention is not limited thereto. For example, a movement of a golf ball shot by a user with a golf club such as a driver or an iron in a room can be reproduced on a real golf course.

Moreover, an information processing system according to an embodiment of the present invention, which transmits movement information of an object hit by a user in a local environment in a room so as to reproduce the movement in a remote environment, is applicable to various games including air hockey.

In summary, the embodiments of the present invention described herein are only exemplary and should not be considered as limiting the scope of the present invention, which should be understood from the appended claims.

The present application contains subject matter related to that disclosed in Japanese Priority Patent Application JP 2008-206779 filed in the Japan Patent Office on Aug. 11, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising:
   an input section that inputs movement information of an object on which a user performed an operation in an operation environment;
   an output section
      that holds another object in a remote site remote from the operation environment and reproduces a movement of the object on which the user performed the operation on the basis of the movement information received from the input section, and
      includes an ejector that ejects the another object, the ejector including a launcher that ejects the another object at a desired speed, and a pan head that rotatably supports the launcher.

2. The information processing system according to claim 1, wherein the input section includes
   a camera that takes images of the movement of the object on which the user performed the operation, and
   a detector that generates the movement information of the object including speed and direction thereof by detecting the movement of the object by processing signals of the images taken by the camera,
   the output section includes
   a movement-to-control-value converter that converts the movement information received from the input section to a control value including the speed and direction, and
   the ejector ejects the another object in accordance with the control value.

3. The information processing system according to claim 2, wherein the launcher ejects the another object in accordance with a speed control value that is output from the movement-to-control-value converter, and the pan head rotates an ejection direction of the launcher by using a direction control value that is output from the movement-to-control-value converter.

4. The information processing system according to claim 3, wherein the launcher includes
   a guide that guides the another object,
   a stopper that stops the another object on the guide, and
   a rubber tire that provides a circumferential speed to an outer periphery of the another object that is input when the stopper is removed, the rubber tire being rotated by a motor.

5. The information processing system according to claim 4, wherein, when a speed specified by the movement information received is equal to or less than a circumferential speed that the rubber tire provides to the another object at a lower limit of a rotation speed of the motor, the rubber tire provides the another object with the specified speed by utilizing residual rotation of the motor that is dependent on a time elapsed after power supply to the motor is stopped.

6. The information processing system according to claim 1, wherein the output section includes
- a camera that takes images of a landscape of the remote site, and
the input section includes
- a projection screen that shows a projected image to the user, and
- a projector that projects the images taken by the camera onto the projection screen.

7. An information processing system comprising:
a first input section that inputs movement information of an object on which a user performed an operation on a user's side of a game played against an opponent;
an object retrieving unit that retrieves the object on which the user performed the operation on the user's side;
a first output section that reproduces, on an opponent's side of the game, a movement of the object on which the user performed the operation on the basis of the movement information received from the first input section;
a second input section that inputs movement information of another object on which the opponent performed an operation on the opponent's side of the game;
a second output section that reproduces, on the user's side of the game and by using the object retrieved by the object retrieving unit, a movement of the another object on which the opponent performed the operation on the basis of the movement information received from the second input section,
wherein the first output section includes a first ejector that ejects the another object, the first ejector including
- a launcher that ejects the corresponding object at a desired speed, and
- a pan head that rotatably supports the launcher.

8. The information processing system according to claim 7, wherein the first input section includes
- a first camera that takes images of the movement of the object on which the user performed the operation, and
- a first detector that generates the movement information of the object including speed and direction thereof by detecting the movement of the object by processing signals of the images taken by the first camera,
the first output section includes
- a first movement-to-control-value converter that converts the movement information received from the first input section to a control value including the speed and direction, and
- the first ejector that ejects the another object in accordance with the control value,
wherein the second input section includes
- a second camera that takes images of the movement of the another object on which the opponent performed the operation, and
- a second detector that generates the movement information of the another object including speed and direction thereof by detecting the movement of the another object by processing signals of the images taken by the second camera, and wherein the second output section includes
- a second movement-to-control-value converter that converts the movement information received from the second input section to a control value including the speed and direction, and
- a second ejector that ejects the object in accordance with the control value.

9. The information processing system according to claim 8, wherein the second ejector includes
- a launcher that ejects the corresponding object at a desired speed, and
- a pan head that rotatably supports the launcher, and
wherein the launcher ejects the corresponding object in accordance with a speed control value that is output from the corresponding movement-to-control-value converter, and the pan head rotates an ejection direction of the launcher by using a direction control value that is output from the corresponding movement-to-control-value converter.

10. The information processing system according to claim 9, wherein the launcher includes
- a guide that guides the object,
- a stopper that stops the object on the guide, and
- a rubber tire that provides a circumferential speed to an outer periphery of the object that is input when the stopper is removed, the rubber tire being rotated by a motor.

11. The information processing system according to claim 10, wherein, when a speed specified by the movement information received is equal to or less than a circumferential speed that the rubber tire provides to the object at a lower limit of a rotation speed of the motor, the rubber tire provides the object with the specified speed by utilizing residual rotation of the motor that is dependent on a time elapsed after power supply to the motor is stopped.

12. The information processing system according to claim 7, wherein the second input section further includes
- a camera that takes images of the opponent's side, and
the second output section further includes
- a projection screen that shows a projected image to the user, and
- a projector that projects the images of the opponent's side taken by the camera onto the projection screen.

* * * * *